(12) United States Patent
Grosso et al.

(10) Patent No.: US 8,676,008 B2
(45) Date of Patent: *Mar. 18, 2014

(54) BRAGG GRATING FIBER HYDROPHONE WITH A BELLOWS AMPLIFIER INCLUDING A FLUID CAVITY AND AN OPTICAL FIBRE IN WHICH THE BRAGG GRATING IS INTEGRATED

(75) Inventors: Gilles Grosso, Six Fours les Plages (FR); Frederic Mosca, Marseilles (FR)

(73) Assignee: Ixblue, Marly le Roi (FR)

( * ) Notice: Subject to any disclaimer, the term of this patent is extended or adjusted under 35 U.S.C. 154(b) by 205 days.

This patent is subject to a terminal disclaimer.

(21) Appl. No.: 13/322,980

(22) PCT Filed: May 27, 2010

(86) PCT No.: PCT/FR2010/051017
§ 371 (c)(1),
(2), (4) Date: Nov. 29, 2011

(87) PCT Pub. No.: WO2010/136724
PCT Pub. Date: Dec. 2, 2010

(65) Prior Publication Data
US 2012/0082415 A1    Apr. 5, 2012

(30) Foreign Application Priority Data
May 29, 2009   (FR) ...................... 09 53581

(51) Int. Cl.
*G02B 11/16*   (2006.01)
*G02B 6/34*    (2006.01)
*H01S 3/00*    (2006.01)
*H01S 3/02*    (2006.01)
*H01S 3/106*   (2006.01)

(52) U.S. Cl.
USPC ...................... 385/37; 359/337.21

(58) Field of Classification Search
USPC ......... 385/31–37, 39; 250/227; 367/149, 163; 359/151, 337.21
See application file for complete search history.

(56) References Cited

U.S. PATENT DOCUMENTS 4,545,253 A * 10/1985 Avicola ........................ 73/655
5,311,485 A * 5/1994 Kuzmenko et al. ........... 367/149
(Continued)

FOREIGN PATENT DOCUMENTS

EP    1310801 A1   5/2003
GB    2145237 A    3/1985
(Continued)

OTHER PUBLICATIONS

Berkoff et al: "Experimental Demonstration of a Fiber Bragg Grating Accelerometer", 1996, IEEE Photonics Technology Letters, vol. 8, No. 12, pp. 1677-1679, XP000679546.
International Search Report, dated Sep. 21, 2010, in PCT/FR2010/051017.
Japanese Office Action, dated Sep. 17, 2013, from corresponding JP application.

*Primary Examiner* — Akm Enayet Ullah
(74) *Attorney, Agent, or Firm* — Young & Thompson

(57) ABSTRACT

A Bragg grating fiber hydrophone, includes a fluid chamber and an optical fiber in which a Bragg grating is integrated, the optical fiber passing through the fluid chamber along a longitudinal axis such that the Bragg grating is positioned inside the latter. The fluid chamber is filled with a compressible fluid and is defined by a casing including two ends connected to the optical fiber. The casing includes at least one portion formed by an extensible and compressible tube extending along the longitudinal axis. The portion formed by an extensible and compressible tube includes an outer end coinciding with one of the two casing ends and can be longitudinally deformed by a difference in the pressures applied on the walls thereof, which results in a variation of the length of the optical fiber as measured by a variation in the wavelength of a luminous flux extracted from the optical fiber.

16 Claims, 3 Drawing Sheets

(56) References Cited

U.S. PATENT DOCUMENTS

Figure 1:
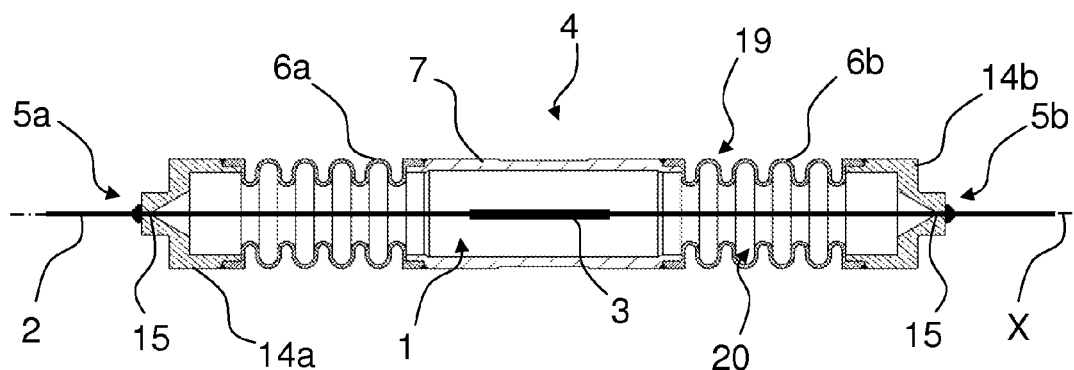

| | | |
|---|---|---|
| 6,160,762 A | 12/2000 | Luscombe et al. |
| 6,175,108 B1 | 1/2001 | Jones et al. |
| 6,422,084 B1 | 7/2002 | Fernald et al. |
| 6,882,595 B2* | 4/2005 | Woo ............... 367/149 |
| 7,315,666 B2* | 1/2008 | Van Der Spek ......... 385/12 |
| 7,369,716 B2* | 5/2008 | Berg et al. ............ 385/12 |
| 8,094,519 B2* | 1/2012 | Lagakos et al. ......... 367/149 |
| 2004/0237648 A1 | 12/2004 | Jones et al. |
| 2012/0093463 A1* | 4/2012 | Grosso et al. .......... 385/37 |
| 2012/0154860 A1* | 6/2012 | Ito ................. 358/1.15 |

FOREIGN PATENT DOCUMENTS

| | | |
|---|---|---|
| JP | H06002176 U | 1/1994 |
| JP | H11248581 A | 9/1999 |
| JP | 2003075464 A | 3/2003 |
| JP | 2004506869 A | 3/2004 |

* cited by examiner

BRAGG GRATING FIBER HYDROPHONE WITH A BELLOWS AMPLIFIER INCLUDING A FLUID CAVITY AND AN OPTICAL FIBRE IN WHICH THE BRAGG GRATING IS INTEGRATED

BACKGROUND OF THE INVENTION

1. Field of the Invention

The present invention relates to the field of the acoustic pressure measurement, in particular in underwater environment.

2. Description of the Related Art

The acoustic sensors such as the hydrophones are conventionally used in an underwater environment to detect acoustic pressure variations that may be caused by seismic waves, by the presence of sea mammals or ships, for example.

They may be used in a static configuration and be deployed on the sea bottom to carry out an acoustic monitoring, or may be towed by a ship or a submarine.

Most of the known acoustic sensors are based on the use of piezoelectric components whose deformation causes a pressure variation that can be measured electronically.

However, such sensors require a local installation, which make them difficult to use for the towed applications, as a seismic sensor for example. Moreover, the piezoelectric components are sensitive to the electromagnetic disturbances.

To remedy these drawbacks, there exist optical fibre hydrophones of the DFB FL type ("Distributed Feedback Fibre Laser") comprising a Bragg grating, and which have the property to emit very fine wavelengths sensitive to the mechanical stress applied to the optical fibre. Measuring these variations of emitted wavelengths makes it possible to deduce the stress applied to the optical fibre and thus the external pressure.

This type of acoustic sensor present advantages such as the absence of electronic components in the immerged part, which make them easier to tow, and the possibility to multiplex several sensors on a same fibre.

However, these optical fibre sensors have an insufficient sensitivity for the detection of low variations of pressure.

To amplify these low variations of pressure, it is known to mechanically amplify the mechanical stress applied to the optical fibre.

Optical fibre sensors comprise an optical fibre surrounded with a cylinder made of elastomeric resin, so as to increase the stresses at the optical fibre by applying shear stresses to the optical fibre generated by the elastic cylinder.

However, such technology does not make it possible to reach the required sensitivities for the detection of small variations of acoustic pressure. Moreover, the Bragg grating being encapsulated in the resin, its operation is modified and its laser frequency decreases.

The document WO 2006/034538 discloses an optical fibre fastened to a flexible support. The latter makes it possible to amplify the acoustic signals.

There also exist acoustic sensors of the "toothpaste tube" type, including an optical fibre provided with a Bragg grating surrounded with a deformable casing filled with an incompressible fluid. The laser fibre is integral with the ends of the deformable casing.

The drawbacks of these prior art hydrophones lie in that they provide too low sensitivities, and are too bulky.

When they are used as streamers towed by a ship or a submarine, and when the acoustic monitoring operation is terminated, the optical fibre is wound with the hydrophone(s) around a winch drum, which is integral with the ship or the submarine.

The prior art hydrophones having high dimensions, they require the use of great diameter drums and do not permit to obtain a homogeneous optical fibre winding.

SUMMARY OF THE INVENTION

The applicant has thus tried to develop a Bragg grating fibre hydrophone having an improved sensitivity and being less bulky with respect to the known hydrophones.

Such a device is provided according to the invention.

The invention relates to a Bragg grating fibre hydrophone comprising a fluid cavity, and an optical fibre in which a Bragg grating is integrated, wherein said optical fibre extends through said fluid cavity along a longitudinal axis (X) and in such a manner that said Bragg grating is positioned inside the latter.

According to the invention:
  said fluid cavity is filled with a compressible fluid and is delimited by a casing comprising two ends integral with the optical fibre,
  said casing comprises at least one part formed by an extensible and compressible tube extending along the longitudinal axis (X), wherein said part formed by an extensible and compressible tube comprises an outer end coinciding with one of the two casing ends, and is capable of being longitudinally deformed by a difference in the pressures applied to its walls, causing a length variation of the optical fibre measured by a variation of wavelength of a luminous flux extracted from the optical fibre.

The invention thus provides a Bragg grating fibre hydrophone with an improved sensitivity with respect to the known hydrophones, making it possible to reach gains higher than 500.

The invention also provides a flexible hydrophone with a low diameter (lower than 10 mm) and a limited bulk, allowing it to be wound around a small diameter winch drum when it is used as a towed streamer.

Indeed, the axial flexibility of the extensible and compressible tubes or bellows allows a slight bending of the hydrophone over its length.

Moreover, due to the fact that the parts formed by an extensible and compressible tube are deformable in the same direction, the hydrophone is insensitive to the accelerometer noise when it is towed by a ship or a submarine.

In various possible embodiments, the device of the invention may also be defined by the following characteristics, which may be considered either alone or in any technically possible combination thereof, and which each provides specific advantages:
  said casing comprises two parts formed by an extensible and compressible tube, and an intermediate part separating said parts formed by an extensible and compressible tube, wherein each of the outer ends of the parts formed by an extensible and compressible tube coincide with one of the two ends of the casing, respectively,
  the intermediate part of the casing is rigid,
  the intermediate part of the casing comprises a wall positioned at the middle thereof, and passed through by the optical fibre,
  the optical fibre is integral with said wall via a fulcrum.

This fulcrum forms a nodal point and makes it possible to shift the effective frequency band toward the high frequencies. It also makes it possible to further the mechanical strength of the hydrophone when the latter is used in a streamer.

said optical fibre is a pre-stressed optical fibre, wherein said optical fibre is kept tensioned between the two casing ends, the Bragg grating fibre hydrophone comprises at least one hydrostatic filter cooperating with the fluid cavity, wherein each hydrostatic filter is provided with an orifice capable of providing a fluid communication between the inside and the outside of the fluid cavity, each hydrostatic filter comprises a tank delimited by a deformable outer casing and by the outer wall of one of the extensible and compressible tubes, wherein said tank is in fluid communication with the fluid cavity through said orifice and wherein said deformable outer casing is tightly fastened to the casing.

The hydrostatic filter makes it possible to pressure compensate the hydrophone during static pressure (immersion) or temperature variations. During a slow variation of pressure or temperature, a flow is established between the fluid cavity and the tank, aiming to balance the internal and external pressures. The very low frequencies are therefore filtered out. The orifice size of the hydrostatic filter determines the low cut-off frequency and thus the low limit of the working band of the hydrophone.

The hydrophone is usable within a wide acoustic frequency range, between 0.4 Hz and 10 kHz.

When the hydrophone is immerged in an underwater environment, and used in a static configuration, the hydrostatic filters make it possible to attenuate the effects of waves and swell.

the Bragg grating fibre hydrophone comprises a flexible and tight outer casing, surrounding the unit formed by the casing and the hydrostatic filters, wherein said outer casing is filled with a fluid so as to transmit the pressure variations external to said fluid cavity, the compressible fluid of the fluid cavity has a compressibility modulus lower than 1.5 Gpa, preferably lower than 0.5 GPa.

BRIEF DESCRIPTION OF THE DRAWING FIGURES

Figure 2:
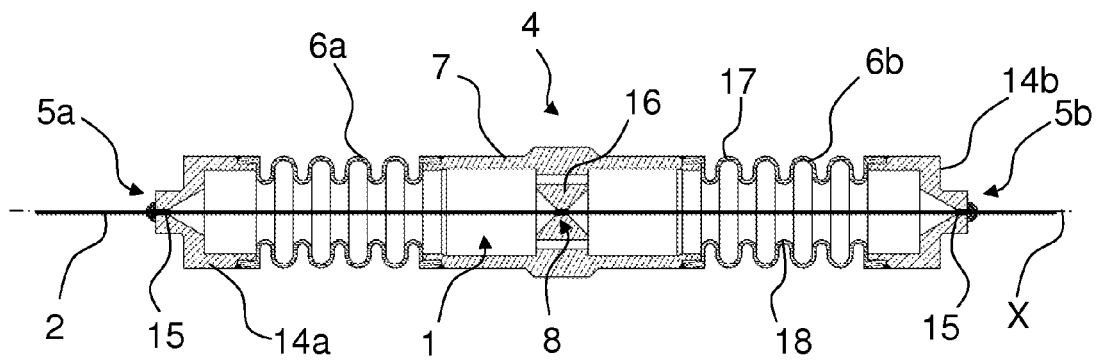
Figure 3:
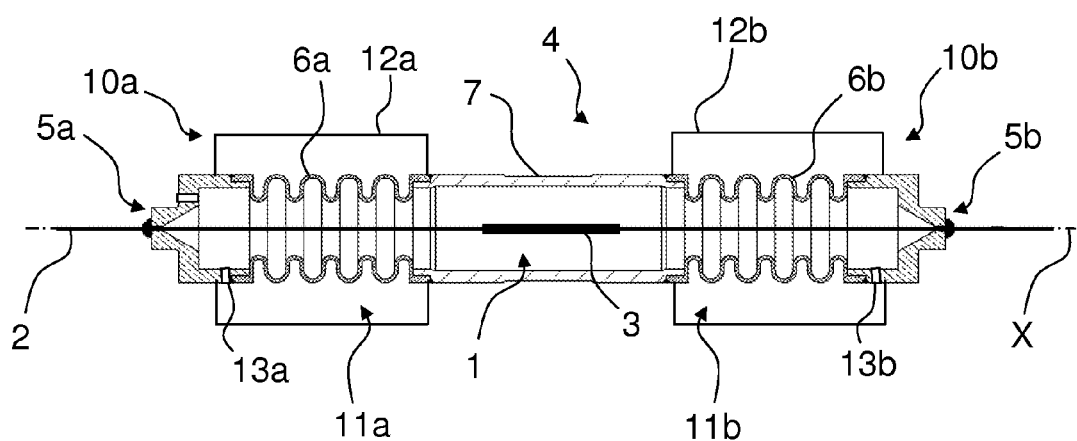
Figure 4:
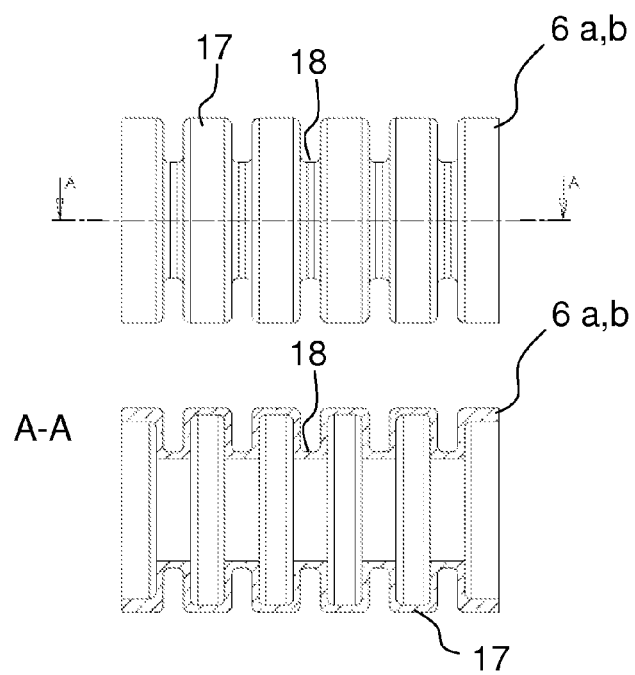
Figure 5:
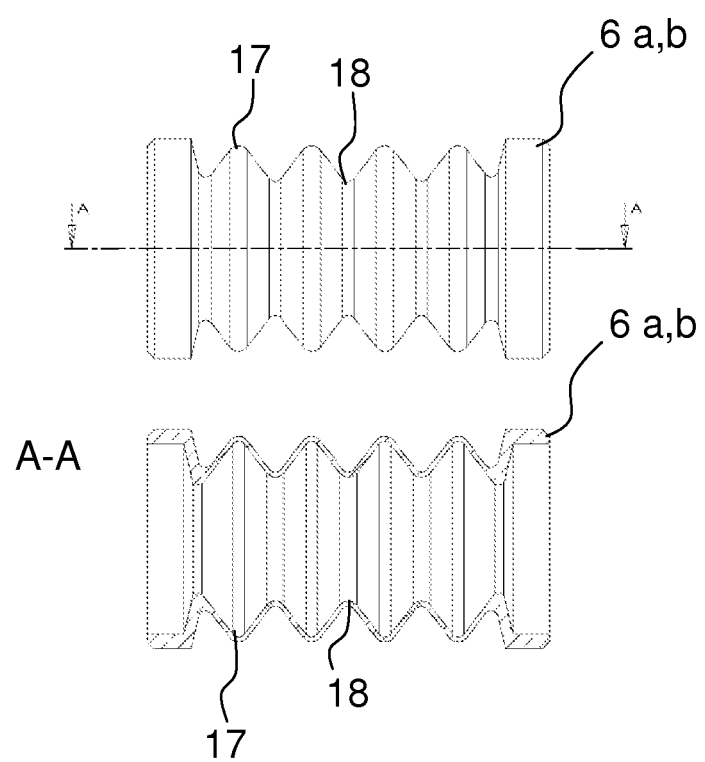

The invention will be described in more detail with reference to the appended drawings, in which:

FIG. 1 shows a longitudinal cross-section of a Bragg grating fibre hydrophone, according to a first embodiment of the invention, FIG. 2 shows a longitudinal cross-section of a Bragg grating fibre hydrophone, according to a second embodiment of the invention, FIG. 3 shows a longitudinal cross-section of a hydrophone with hydrostatic filters, FIGS. 4 and 5 show examples of possible extensible and compressible tubes, one with square-section rings and the other with triangular-section rings.

DETAILED DESCRIPTION OF THE INVENTION

FIG. 1 shows a longitudinal cross-section of a Bragg grating fibre hydrophone, according to a first embodiment of the invention.

The Bragg grating fibre hydrophone comprises a fluid cavity 1 filled with a compressible fluid and delimited by a casing 4 comprising two ends 5a, 5b.

The Bragg grating fibre hydrophone also comprises an optical fibre 2 in which is integrated a Bragg grating 3, forming a laser cavity. The Bragg grating 3 may be photo-inscribed in the optical fibre 2.

The optical fibre 2 extends through the fluid cavity 1 along a longitudinal axis (X) in such a manner that the Bragg grating 3 is positioned inside the latter. The two ends 5a, 5b of the casing 4 are integral with the optical fibre 2.

The casing 4 comprises at least one part formed by an extensible and compressible tube 6a, 6b extending along the longitudinal axis (X). The part formed by the extensible and compressible tube 6a, 6b comprises an outer end coinciding with one of the two casing ends 5a, 5b. The extensible and compressible tube 6a, 6b forms a flexible bellows that may be folded or unfolded along the longitudinal axis (X).

In the examples of FIGS. 1 to 3, the casing 4 comprises two parts formed by an extensible and compressible tube 6a, 6b, and an intermediate part 7 separating the parts formed by an extensible and compressible tube 6a, 6b. These parts 6a, 6b, 7 are tightly assembled together.

Each of the outer ends of the parts formed by an extensible and compressible tube 6a, 6b coincides with one of the two ends 5a, 5b of the casing 4, respectively.

The inner end of each extensible and compressible tube 6a, 6b is tightly fastened to one of the ends of the intermediate part 7.

The outer end of each extensible and compressible tube 6a, 6b forms one of the ends of the casings 5a, 5b.

The unit formed by the extensible and compressible tubes 6a, 6b and the intermediate part 7 is preferably symmetrical.

The two extensible and compressible tubes 6a, 6b are identical to each other. The Bragg grating 3 is positioned at the centre of the casing 4, i.e. at the centre of the intermediate part 7.

The extensible and compressible tubes 6a, 6b comprise a succession of outer rings (or spires) 17 of diameter $d_1$, linked to each other by inner rings (or spires) 18 of diameter $d_2$, lower than $d_1$, forming crenels.

In FIGS. 1 to 3, these outer and inner rings 17, 18 have a rounded surface. Each extensible and compressible tube 6a, 6b comprises four outer rings 17 and five inner rings 18. The gain obtained is a function of the number of outer and inner rings 17, 18. The more there are rings, the greater is the gain.

The shape, profile and thickness of the extensible and compressible tubes 6a, 6b or bellows influence the mechanical flexibility and the axial deformation of the latter.

Other forms of extensible and compressible tubes 6a, 6b are possible.

FIG. 4 shows an extensible and compressible tube 6a, 6b comprising square-section outer 17 and inner 18 rings.

FIG. 5 shows an extensible and compressible tube 6a, 6b comprising triangular-section outer 17 and inner 18 rings.

The profile of the extensible and compressible tubes 6a, 6b has to provide the maximum axial displacement for a minimum radial displacement, and the maximum axial displacement for a minimum variation of volume of the fluid, and this whatever the elasticity and compressibility of the fluid.

The axial displacement has to be maximum for the inner rings 18, which causes a minimum variation of volume.

The plane walls have to be the most perpendicular possible to the longitudinal axis (X), so as to reduce the stiffness of the extensible and compressible tubes 6a, 6b. The surface of these plane walls has to be the largest possible.

The outer rings 17 have to be the more resistant possible with respect to the radial forces so as to limit the radial compression of the extensible and compressible tubes 6a, 6b and thus to limit the variation of volume of the fluid.

The crenels of the extensible and compressible tubes 6a, 6b have to be asymmetrical along the longitudinal axis (X). The inner rings 18 have to be wider than the outer rings 17, so as to maximally increase the inner volume of the fluid cavity 1.

The extensible and compressible tubes 6a, 6b may also comprise a spiral- or helical-shaped outer ring 17 and inner ring 18.

In this example, the optical fibre 2 has a sensitivity comprised between 3 and 4.5 nm/MPa, a diameter of 125 µm, and a Young modulus comprised between 50 GPa and 90 GPa, preferably equal to 70 GPa.

The two ends 5a, 5b of the casing 4 are passed through by the optical fibre 2, and are integral with the latter. They may be fastened to the optical fibre 2 by welding or bonding, for example. The welding may be a laser welding with or without a ferule. The bonding may be a polyamide coating or epoxy adhesive bonding.

The parts formed by an extensible and compressible tube 6a, 6b are each longitudinally deformable, i.e. capable of having their length varied, by a difference in the pressures applied to its walls, causing a length variation of the optical fibre 2 measured by a variation of wavelength of a luminous flux extracted from the optical fibre 2. More precisely, this is the variation of the laser cavity length that is measured.

Each extensible and compressible tube 6a, 6b forms a mechanical amplifier, amplifying the deformation of the optical fibre 2.

The relation between the wavelength and pressure variations is expressed as follows:

$$\Delta\lambda = S_{opt} G_{meca} \Delta P$$

where $\Delta P$ is the pressure applied to the structure, $S_{opt}$ is the sensitivity of the "bare" Bragg grating, and $G_{meca}$ is the desired mechanical gain.

The optical pumping of the optical fibre 2 may be performed by a laser diode at 980 nm, for example. The luminous flux extracted from the optical fibre 2 has a wavelength that is a function of the lengthening or the shortening of the optical fibre 2. The wavelength variations are measured by a Mach Zehnder interferometer, for example.

The extensible and compressible tubes 6a, 6b are deformable mainly along the longitudinal axis (X) and are very little deformable in the radial direction.

When the external pressure $P_e$ is higher than the internal pressure $P_i$, the extensible and compressible tubes 6a, 6b are compressed, which reduces the volume of the fluid cavity 1, and causes a shortening of the optical fibre 2 (or of the laser cavity).

The external pressure $P_e$ is applied to the outer wall 19 of the extensible and compressible tubes 6a, 6b, while the internal pressure $P_i$ is applied to the inner wall 20 of the extensible and compressible tubes 6a, 6b.

And conversely, when the external pressure $P_e$ is lower than the internal pressure $P_i$, the extensible and compressible tubes 6a, 6b are lengthened, which causes a lengthening of the optical fibre 2.

The length of the hydrophone is shorter than the acoustic wavelengths measured. The pressure field is supposed to be homogeneous.

Consequently, in static configuration, the extensible and compressible tubes 6a, 6b are simultaneously compressed or extended.

The extensible and compressible tubes 6a, 6b may be made of metal or polymer, for example.

The intermediate part 7 of the casing 4 may be rigid of flexible. In the case of a rigid casing 4, it may be made of titanium, for example.

The compressible fluid of the fluid cavity 1 has a compressibility modulus lower than 1.5 Gpa, preferably lower than 1.5 GPa.

The compressible fluid may be based on fluorocarbon, as for example perfluorohexane ($C_6F_{14}$), which has a compressibility modulus of 1 GPa.

In the examples of FIGS. 1 to 3, the fluid used is inert fluorine provided by the 3M company.

The two extensible and compressible tubes 6a, 6b may end at each of their outer end, i.e. at the ends 5a, 5b of the casing 4, by two respective tips 14a, 14b. These tips 14a, 14b are rigid and integral with the optical fibre 2.

In the examples of FIGS. 1 to 3, the two extensible and compressible tubes 6a, 6b have circular sections, and the intermediate or central part 7 is in the form of a circular-section tube. The two tips 14a, 14b have a cylindrical shape. The hydrophone has a general tubular shape.

According to a possible method of assembling the hydrophone, the two extensible and compressible tubes 6a, 6b are tightly fitted into either side of the intermediate part 7.

The two tips 14a, 14b are then tightly fitted into each outer end of the extensible and compressible tubes 6a, 6b.

The optical fibre 2 is then threaded into the two tips 14a, 14b so as to extend through the casing 4 along the main axis (X).

In this example in which the casing 4 has a tubular shape, the main axis (X) is a longitudinal central axis. The optical fibre 2 passes through the centre of the casing 4.

The principle of operation of the Bragg grating or laser fibre hydrophone is based on the lengthening of a laser cavity (Bragg grating 3).

The geometry of the Bragg grating 3 and the index of the medium determine the resonance frequency of the laser cavity, and thus the wavelength thereof. The radial pressure applied to the laser cavity modifies the geometry thereof and induces stresses in the silica of the fibre. The lengthening and the stress level in the laser cavity modify the geometry and the medium's index, respectively. These modifications induce a variation of the resonance frequency, thus of the laser wavelength. The optical fibre hydrophone uses this property for detecting the acoustic waves.

The sensitivity of the hydrophone is characterized by the ratio $$\frac{\varepsilon_x}{P_e},$$

where $\varepsilon_x$ is the axial lengthening of the optical fibre (laser cavity) and $P_e$ is the external pressure. In the case of the fibre alone, the theoretical sensitivity is $$\frac{\varepsilon_x}{P_e} = 2\frac{\nu}{E} = 4.7 * 10^{-12},$$

where E and $\nu$ are the Young modulus and the Poisson ratio of the silica, respectively.

The extensible and compressible tubes 6a, 6b, the compressible fluid and the casing 4 form a mechanical amplifier for increasing this sensitivity to the external pressure $P_e$.

Such amplifier permits to amplify the axial deformations, while the radial deformations remain very low.

During the hydrophone operation, a low-frequency acoustic wave causes a local variation of the pressure around the hydrophone.

The external pressure ($P_e$) thus becomes different from the pressure ($P_i$) within the fluid cavity 1.

The fluid cavity 1, via its compressibility, tends to balance its pressure with the external pressure by a variation of its volume:

$$-\frac{1}{\chi_s}\frac{dV}{V} = (Pe - Pi)$$

where $\chi_s$ is the adiabatic compressibility of the fluid, V is the volume of the fluid cavity 1, and dV is the variation of volume of the cavity.

The hydrophone geometry forces the optical fibre 2 to deform axially.

Locally, on one of the extensible and compressible tubes 6a, 6b, the volume variation takes the form:

$$dV = dx * S_{ax} + (\pi R^2 - \pi (R+dr)^2)l$$

where $S_{ax}$ is the surface orthogonal to the axis of the extensible and compressible tube 6a, 6b, R is the outer radius of the extensible and compressible tube 6a, 6b, and l is the length thereof.

Wherein:

$$dx = \frac{P * S_{ax}}{k_{ax}}$$

and $$dr = \frac{P * S_r}{k_{rad}}$$

where $k_{ax}$ and $k_{rad}$ are the axial and radial stiffness of the fluid, respectively, $S_r$ is the radial surface of the extensible and compressible tube 6a, 6b, and P is the incident pressure.

The extensible and compressible tubes 6a, 6b direct the deformations in the axial direction by: $k_{ax} \ll k_{rad}$.

The gain may also be expressed as the ratio between the axial deformation of the optical fibre due to the mechanical amplifier and the axial deformation of this fibre due to the pressure to the latter, in bare state.

The following embodiment gives an example of possible sizes for the hydrophone.

The intermediate part 7 may have an outer diameter of 10 mm.

The extensible and compressible tubes 6a, 6b may have outer rings with an outer diameter of 10 mm, for example.

Generally, the outer rings of the extensible and compressible tubes 6a, 6b, and the intermediate part 7, may have an outer diameter lower than 10 mm.

The optical fibre may have a diameter of 125 μm, and the Bragg grating 3 may extend over a length of 50 mm. The compressibility modulus of the compressible fluid may be of 1 Gpa. These parameters make it possible to reach a gain of 800.

Other dimensions are also possible, providing different gains.

Generally, the hydrophone according to the invention makes it possible to reach gains higher than 500.

The optical fibre 2 is a pre-stressed optical fibre.

According to a possible embodiment, this pre-stress is applied by the two ends 5a, 5b of the casing 4 (or of the extensible and compressible tubes 6a, 6b).

Once the mechanical amplifier is assembled, the optical fibre 2 is threaded into orifices 15 provided in the tips 14a, 14b of the extensible and compressible tubes 6a, 6b, so that the Bragg grating 3 is located at the centre of the fluid cavity 1.

The optical fibre 2 is then fastened to the end of one of the tips 14a, 14b by welding or bonding.

Once the optical fibre 2 is fastened on one side, a calibrated pre-stress is applied on the other side, by pulling the optical fibre 2.

The optical fibre 2 being tensioned, it is welded or bonded to the end of the other tip 14a, 14b by welding or bonding.

The optical fibre 2 is then tensioned between the two ends 5a, 5b of the casing 4.

That way, a perfect balance of the tension of the optical fibre 2 on each side of the ends 5a, 5b of the casing 4 is obtained.

The optical fibre 2 is then cut and butt jointed on either side with a cladded optical fibre.

Such pre-stress makes it possible to avoid the optical fibre 2 to fold over itself during a strong acoustic pressure.

The pre-stress applied to the optical fibre 2 is calculated to be higher than the maximum deformations the device will be capable of tolerating. Therefore, the optical fibre 2 will always be tensioned during the hydrophone operation.

The maximum pre-stress that can be applied to the fibre is 2N, which corresponds to a maximum stress of $$\sigma = \frac{F}{s_{fibre}} = 1.63 \cdot 10^8 \text{ Pa},$$

for an optical fibre 2 of diameter 125 μm.

The Young modulus of the optical fibre 2 being of 70 GPa, the maximum expansion operating deformation of the optical fibre 2 is thus:

$$\varepsilon_{pc} = \frac{\sigma}{E} = 2.3 \cdot 10^{-3}.$$

The maximum operating acoustic pressure of the hydrophone is thus:

$$P_{max} = \frac{\varepsilon_{pc}}{\varepsilon_{1Pa}} = \frac{\varepsilon_{pc}}{G \cdot \varepsilon_{ref}} = \frac{2.3 \cdot 10^{-3}}{4.72 \cdot 10^{-9}} = 4.87 \text{ bar}.$$

That is to say a maximum operating acoustic pressure of:

$$S_{max} = 20\log_{10}\left(\frac{P_{max}}{P_{ref}}\right) = 20\log_{10}\left(\frac{4.87 \cdot 10^5}{1 \cdot 10^{-6}}\right) = 234 \text{ dB}$$

According to a possible embodiment (not illustrated), the tension of the optical fibre 2 is held by holding means arranged on either side of the fluid cavity 1, and leaning on the intermediate part 7.

According to an embodiment, the Bragg grating fibre hydrophone comprises at least one hydrostatic filter 10a, 10b, associated with one extensible and compressible tube 6a, 6b of the casing 4, respectively.

As illustrated by the embodiment of FIG. 3, the hydrophone comprises two hydrostatic filters 10a, 10b, arranged on either side of the intermediate part 7.

Each hydrostatic filter 10a, 10b has a tank 11a, 11b delimited by a deformable outer casing 12a, 12b and by one of the extensible and compressible tubes 6a, 6b.

The tank 11a, 11b is in fluid communication with the fluid cavity 1 by means of an orifice 13a, 13b extending through each tip 14a, 14b. The deformable outer casing 12a, 12b tightly surrounds one of the extensible and compressible tubes 6a, 6b.

The deformable outer casing 12a, 12b of the hydrostatic filter 10a, 10b has a cylindrical shape and may be made of polymer, for example.

The tanks 11a, 11b and the fluid cavity 1 are filled with the same compressible fluid.

Each deformable outer casing 12a, 12b transmits the pressure variations to one of the extensible and compressible tubes 6a, 6b, by means of the compressible fluid.

The orifices 13a, 13b of the hydrostatic filters 10a, 10b have a diameter comprised between 100 μm and 20 μm, preferably equal to 50 μm.

The hydrostatic filters 10a, 10b make it possible to place the inner fluid at the hydrostatic pressure after a slow pressure variation following a change of temperature or immersion. Therefore, it is possible to free from the hydrostatic pressure and to take into account only the pressure variations around this pressure. It is to be noted that these hydrostatic filters represent a limitation for the detection of very low frequencies. Indeed, the time of reaction of the hydrostatic filter will determine the lowest frequency that can be measured by the hydrophone. The hydrostatic filters are high-pass filters. Therefore, if the frequency of the acoustic wave is lower than the cut-off frequency of the hydrostatic filter, it will be without effect on this acoustic wave.

The very low frequencies are filtered out by this method. The hole size of the hydrostatic filters determines the low cut-off frequency, and thus the low limit of the working band of the hydrophone. The smaller the orifice 13a, 13b is, the lower the cut-off frequency is.

The cut-off frequency is lower than 10 Hz, preferably equal to 0.4 Hz.

The hydrophone makes it possible to detect acoustic waves in the frequency band comprised between 0.4 Hz and 10 kHz.

The elements forming the hydrophone, as for example the extensible and compressible tubes 6a, 6b and the optical fibre 2, have a resonance frequency outside the frequency range from 0.4 Hz to 10 kHz.

The orifices 13a, 13b of the hydrostatic filters 10a, 10b make it possible to perform a pressure balance between the inside of the casing 4 and the inside of the tanks 11a, 11b of the hydrostatic filters 10a, 10b, and a temperature compensation, making the hydrophone insensitive to the slow variations of pressure and temperature during immersions of the hydrophone at variable depths.

When the hydrophone is immersed in an underwater environment, and used in a static configuration, the hydrostatic filters 10a, 10b make it possible to attenuate the effects of waves and swell.

According to a possible embodiment illustrated in FIG. 2, the intermediate part 7 of the casing comprises a wall 16 positioned at the middle thereof. This wall 16 may be tight or not.

This wall 16 makes it possible to limit the effect of the intermediate part 7 of the casing by radially stiffening it. In this case, only the two extensible and compressible tubes 6a, 6b work.

The optical fibre 2 may be integral with this wall 16 via a fulcrum 8 at the middle thereof, such point forming a nodal point.

This nodal point has for effect to double the natural resonance of the optical fibre 2, which may be a factor limiting the working band. The natural frequency of the optical fibre 2 must necessarily be outside the working band of the hydrophone.

This fulcrum 8 makes it possible to shift the effective frequency band toward the high frequencies. It also makes it possible to further the mechanical strength of the hydrophone when the latter is used in a streamer.

The optical fibre 2 is then integral with the casing 4 via three fulcrums or nodal points.

Grooves may be provided in the outer surface of the casing 4 to accommodate external optical fibres that may be connected to other acoustic pressure sensors, for example.

The Bragg grating fibre hydrophone comprises a flexible and tight outer casing (not shown), surrounding the casing 4 and the hydrostatic filters 10a, 10b. The outer casing is cylindrical and filled with a fluid so as to transmit the pressure variations external to said fluid cavity 1.

This fluid may be castor oil, for example. The outer casing may be made of polymer, for example Hypalon®.

Therefore, the invention provides a hydrophone that makes it possible to reach high gains, higher than 500, and thus acoustic sensitivities higher than those reached by the known hydrophones.

The invention also provides a hydrophone having a reduced diameter (lower than 10 mm) with respect to that of the known hydrophones, and thus a reduced bulk.

The invention claimed is:

1. A Bragg grating fibre hydrophone comprising:
a fluid cavity (1); and
an optical fibre (2) in which a Bragg grating (3) is integrated, wherein
said optical fibre (2) extends through said fluid cavity (1) along a longitudinal axis (X) and in such a manner that said Bragg grating (3) is positioned inside the fluid cavity,
said fluid cavity (1) is filled with a compressible fluid and is delimited by a casing (4) comprising two ends (5a, 5b) integral with the optical fibre (2),
said casing (4) comprises at least one part formed by an extensible and compressible tube (6a, 6b) extending along the longitudinal axis (X), wherein said part formed by the extensible and compressible tube (6a, 6b) comprises an outer end coinciding with one of the two casing ends (5a, 5b), and is configured to be longitudinally deformed by a difference in the pressures applied to its walls, causing a length variation of the optical fibre (2) measured by a variation of wavelength of a luminous flux extracted from the optical fibre (2), and
said casing (4) comprising two parts formed by the extensible and compressible tube (6a, 6b), and a rigid intermediate part (7) separating said parts formed by the extensible and compressible tube (6a, 6b), wherein each of the outer ends of the parts formed by the extensible and compressible tube (6a, 6b) coincide with one of the two ends (5a, 5b) of the casing (4), respectively.

2. The Bragg grating fibre hydrophone according to claim 1, wherein the intermediate part (7) of the casing comprises a wall (16) positioned at the middle thereof, and passed through by the optical fibre (2).

3. The Bragg grating fibre hydrophone according to claim 2, wherein the optical fibre (2) is integral with said wall (16).

4. The Bragg grating fibre hydrophone according to claim 1, wherein said optical fibre (2) is a pre-stressed optical fibre, wherein said optical fibre (2) is kept tensioned between the two casing ends (5a, 5b).

5. The Bragg grating fibre hydrophone according to claim 1, further comprising at least one hydrostatic filter (10a, 10b) cooperating with the fluid cavity (1), wherein each hydrostatic filter (10a, 10b) is provided with an orifice (13a, 13b) capable of providing a fluid communication between the inside and the outside of the fluid cavity (1).

6. The Bragg grating fibre hydrophone according to claim 5, wherein each hydrostatic filter (10a, 10b) comprises a tank (11a, 11b) delimited by a deformable outer casing (12a, 12b) and by the outer wall of one of the extensible and compressible tubes (6a, 6b), wherein said tank (11a, 11b) is in fluid communication with the fluid cavity (1) through said orifice (13a, 13b) and wherein said deformable outer casing (12a, 12b) is tightly fastened to the casing (4).

7. The Bragg grating fibre hydrophone according to claim 1, further comprising a flexible and tight outer casing, surrounding the unit formed by the casing (4) and the hydrostatic filters (10a, 10b), wherein said outer casing is filled with a fluid so as to transmit the pressure variations external to said fluid cavity (1).

8. The Bragg grating fibre hydrophone according to claim 1, wherein the compressible fluid of the fluid cavity (1) has a compressibility modulus lower than 1.5 Gpa.

9. The Bragg grating fibre hydrophone according to claim 2, wherein said optical fibre (2) is a pre-stressed optical fibre, wherein said optical fibre (2) is kept tensioned between the two casing ends (5a, 5b).

10. The Bragg grating fibre hydrophone according to claim 2, further comprising at least one hydrostatic filter (10a, 10b) cooperating with the fluid cavity (1), wherein each hydrostatic filter (10a, 10b) is provided with an orifice (13a, 13b) capable of providing a fluid communication between the inside and the outside of the fluid cavity (1).

11. The Bragg grating fibre hydrophone according to claim 2, further comprising a flexible and tight outer casing, surrounding the unit formed by the casing (4) and the hydrostatic filters (10a, 10b), wherein said outer casing is filled with a fluid so as to transmit the pressure variations external to said fluid cavity (1).

12. The Bragg grating fibre hydrophone according to claim 2, wherein the compressible fluid of the fluid cavity (1) has a compressibility modulus lower than 1.5 Gpa.

13. The Bragg grating fibre hydrophone according to claim 1, wherein the compressible fluid is perfluorohexane.

14. The Bragg grating fibre hydrophone according to claim 1, wherein the hydrophone has a sensitivity characterized by the ratio $\epsilon_x/P_e$ where $\epsilon_x$ is the axial lengthening of the optical fibre and $P_e$ is external pressure.

15. The Bragg grating fibre hydrophone according to claim 14, wherein the optical fibre has a theoretical sensitivity of $\epsilon_x/P_e = 2v/E = 4.7*10^{-12}$ where E and v are the Young modulus and the Poisson ratio of silica, respectively.

16. The Bragg grating fibre hydrophone according to claim 1, wherein The fluid cavity (1), via its compressibility, tends to balance its pressure with the external pressure by a variation of its volume:

$$-1/\chi_s dV/V = (Pe - Pi)$$

where $\chi_s$ is the adiabatic compressibility of the fluid, V is the volume of the fluid cavity (1), and dV is the variation of volume of the cavity.

* * * * *

UNITED STATES PATENT AND TRADEMARK OFFICE
CERTIFICATE OF CORRECTION

PATENT NO.       : 8,676,008 B2
APPLICATION NO. : 13/322980
DATED            : March 18, 2014
INVENTOR(S)      : Grosso et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this

Twenty-ninth Day of September, 2015

Michelle K. Lee
*Director of the United States Patent and Trademark Office*